(12) United States Patent
Itabashi et al.

(10) Patent No.: US 9,333,495 B2
(45) Date of Patent: May 10, 2016

(54) METHOD FOR PRODUCING MTW-TYPE ZEOLITE

(75) Inventors: Keiji Itabashi, Tokyo (JP); Tatsuya Okubo, Tokyo (JP); Kenta Iyoki, Tokyo (JP)

(73) Assignees: UniZeo Co., Ltd., Tokyo (JP); The University of Tokyo, Tokyo (JP)

( * ) Notice: Subject to any disclaimer, the term of this patent is extended or adjusted under 35 U.S.C. 154(b) by 180 days.

(21) Appl. No.: 13/509,677

(22) PCT Filed: Nov. 19, 2010

(86) PCT No.: PCT/JP2010/070663
§ 371 (c)(1),
(2), (4) Date: Mar. 1, 2013

(87) PCT Pub. No.: WO2011/062256
PCT Pub. Date: May 26, 2011

(65) Prior Publication Data
US 2013/0156689 A1 Jun. 20, 2013

(30) Foreign Application Priority Data
Nov. 20, 2009 (JP) ................................. 2009-264550

(51) Int. Cl.
*C01B 39/42* (2006.01)
*B01J 29/70* (2006.01)
*B01J 20/30* (2006.01)

(52) U.S. Cl.
CPC .......... *B01J 29/7034* (2013.01); *B01J 20/3078* (2013.01); *C01B 39/42* (2013.01)

(58) Field of Classification Search
CPC .... C01B 33/2853; C01B 39/48; C01B 39/02; C01B 33/2838; C01B 39/42; B01J 29/40; B01J 29/7034
See application file for complete search history.

(56) References Cited

U.S. PATENT DOCUMENTS 3,415,736 A * 12/1968 Ciric .......................... 208/111.15
4,275,047 A * 6/1981 Whittam ........................ 423/709
(Continued)

FOREIGN PATENT DOCUMENTS

CN 101249968 A 8/2008
EP 0156595 * 3/1985
(Continued)

OTHER PUBLICATIONS

Kamimura et al Dai 26 Kai Zeilite Kenkyu Happyokai Keon Yokoshu 2010, 19-19.*
(Continued)

*Primary Examiner* — David M Brunsman
(74) *Attorney, Agent, or Firm* — Locke Lord LLP; James E. Armstrong, IV; Nicholas J. DiCeglie, Jr.

(57) ABSTRACT

A method for producing an MTW-type zeolite, comprising (1) mixing an alumina source, an alkali source, a lithium source, and water so as to obtain a reaction mixture (2) Adding a seed crystal of an MTW-type zeolite before or while a silica source is added to the reaction mixture in a proportion of 0.1 to 20% by weight relative to the silica component in the reaction mixture. Mixing and stirring the reaction mixture. Wherein the MTW-type zeolite of the seed crystal has a $SiO_2/Al_2O_3$ ratio of 10 to 500 and does not contain an organic compound. The reaction mixture has a composition represented by the following molar ratios: $SiO_2/Al_2O_3$=12 to 200, $Na_2O/SiO_2$=0.1 to 0.3, $Li_2O/(Na_2O+Li_2O)$=0.05 to 0.5 and $H_2O/SiO_2$=10 to 50. (3) Air tightly heating the reaction mixture, to which the seed crystal of the MTW type zeolite has been added, at 100 to 200° C.

1 Claim, 3 Drawing Sheets

(56) References Cited

U.S. PATENT DOCUMENTS

| | | | |
|---|---|---|---|
| 4,743,437 A | 5/1988 | Whittam | |
| 5,021,141 A * | 6/1991 | Rubin | 208/46 |
| 7,112,316 B1 | 9/2006 | Konrad et al. | |
| 8,398,955 B2 * | 3/2013 | Lai | 423/700 |
| 8,834,836 B2 * | 9/2014 | Itabashi | 423/709 |
| 2007/0191660 A1 * | 8/2007 | Johnson et al. | 585/467 |
| 2013/0156690 A1 * | 6/2013 | Itabashi | C01B 39/02 423/709 |

FOREIGN PATENT DOCUMENTS

| | | |
|---|---|---|
| EP | 0156595 A2 | 10/1985 |
| EP | 0162719 A2 | 11/1985 |
| JP | 52-16079 B2 | 10/1972 |
| JP | 55-116619 A | 9/1980 |
| JP | 63-31406 B2 | 12/1980 |
| JP | 57-156322 A | 9/1982 |
| JP | 60-264320 A | 12/1985 |

OTHER PUBLICATIONS

Yasuhiro Suzuki et al., "Cooperative Effect of Sodium and Potassium Cations on Synthesis of Ferrierite", Top Catal, 2009, vol. 52, pp. 67-74.

Notice of Office Action mailed Aug. 6, 2013, issued for CN Application No. 201080052299.5 and English translation thereof.

Office Action dated Jul. 4, 2013, issued for the German Patent Application No. 11 2010 004 511.9 and brief English summary of the Examiner's comments provided by the foreign associate.

Ch. Baerlocher, L.B. McCusker, D.H. Olson, "Atlas of Zeolite Framework Types," Published on behalf of the Commission of the International Zeolite Association, 2007, p. 232-233.

M.M.J. Treacy and J.B. Higgins, "Collection of Simulated XRD Powder Patterns for Zeolites," Published on behalf of the Commission of the International Zeolite Association, 2007, p. 300-301.

International Search Report dated Feb. 22, 2011, issued for PCT/JP2010/070663.

* cited by examiner

METHOD FOR PRODUCING MTW-TYPE ZEOLITE

This application is a 371 filing of PCT/JP2010/070663, filed Nov. 19, 2010.

TECHNICAL FIELD

The present invention relates to a method for producing an MTW-type zeolite from a reaction mixture in which an organic compound is not used, by adding an MTW-type zeolite which does not contain an organic compound, as a seed crystal.

BACKGROUND ART

Synthetic zeolite is a crystalline aluminosilicate and has uniform micropores in an angstrom size resulting from the crystal structure thereof. Taking advantage of this feature, the synthetic zeolite has been industrially used as a molecular sieve adsorbent which adsorbs only the molecules having a specific size, an adsorption separating agent which adsorbs molecules having high affinity, or a catalyst base agent. MTW is a designation representing the framework structure type given to zeolite ZSM-12, and zeolite having the same structure includes CZH-5, NU-13, TPZ-12, Theta-3, and VS-12. The MTW-type zeolite is used in a large amount all over the world at present as a catalyst in petrochemical industry. The feature of the MTW-type zeolite is in that it has 12 membered-ring one-dimensional micropores as described in the following Non Patent Literature 1. Further, the X-ray diffraction pattern showing the structural feature thereof is described in the following Non Patent Literature 2.

Since the MTW-type zeolite has been conventionally produced only by a method in which an organic ammonium ion is used as a structure-directing agent (hereinafter abbreviated as "SDA"), it has been considered that the use of SDA is essential in order to obtain the MTW-type zeolite. Further, since synthesized MTW-type zeolite contains SDA, it has been considered inevitable that the zeolite is fired to remove SDA before it is used.

Various methods for synthesizing the MTW-type zeolite are proposed. A common method is a method of using organic ammonium ions, such as tetraethylammonium ions, methyltriethylammonium ions, or benzyltriethylammonium ions, as SDA. Also, at the same time, addition of alkali metal ions, such as sodium or lithium, is essential. Such a method is for example described in the following Patent Literatures 1 to 3. According to these methods, an MTW-type zeolite having a $SiO_2/Al_2O_3$ ratio of 20 or more can be obtained. However, the SDAs as described above are expensive, and most SDAs in mother liquor may be decomposed after completion of the crystallization of the MTW-type zeolite. Further, since these SDAs are incorporated into the crystals of the zeolite to be produced, it is necessary to fire the zeolite to remove the SDAs when using the zeolite as an adsorbent or a catalyst. The exhaust gas from the firing causes environmental pollution, and further a large amount of chemicals is required for the detoxification treatment of the synthetic mother liquor containing decomposition products of SDAs. Thus, since the synthetic method of the MTW-type zeolite using SDA is not only expensive, but is a production method having a high environmental load, the realization of a production method in which SDA is not used and an MTW-type zeolite which is obtained by the production method and does not essentially contain organic matter is desired.

CITATION LIST

Patent Literature

Patent Literature 1: Japanese Patent Publication No. 52-16079
Patent Literature 2: Japanese Patent Publication No. 63-31406
Patent Literature 3: Japanese Patent Laid-Open No. 60-264320
Non Patent Literature 1: Ch. Baerlocher, L. B. McCusker, D. H. Olson, Atlas of Zeolite Framework Types, Published on behalf of the Commission of the International Zeolite Association, 2007, p. 232-233
Non Patent Literature 2: M. M. J. Treacy and J. B. Higgins, Collection of Simulated XRD Powder Patterns for Zeolites, Published on behalf of the Commission of the International Zeolite Association, 2007, p. 300-301

SUMMARY OF INVENTION

Technical Problem

An object of the present invention is to provide a method for producing an MTW-type zeolite which does not essentially contain organic matter, specifically a method which eliminates the prior art disadvantages as described above, can reduce an environmental load as much as possible, and can produce an MTW-type zeolite without using SDA and inexpensively.

Solution to Problem

A conventional method for producing an MTW-type zeolite is a method in which organic ammonium ions are used as SDA, and at the same time alkali metal ions are added, as described above. However, a method of producing an MTW-type zeolite by using only alkali metal ions without using SDA has not been known at all. The present inventors have found a method for producing an MTW-type zeolite in which SDA is not used, by firing an MTW-type zeolite which has been synthesized using SDA to remove SDA and using the fired MTW-type zeolite as a seed crystal. These findings have led to the completion of the present invention.

Specifically, the present invention provides a method for producing an MTW-type zeolite comprising:
(1) mixing a silica source, an alumina source, an alkali source, a lithium source, and water so as to obtain a reaction mixture having a composition represented by the following molar ratios:
$SiO_2/Al_2O_3$=12 to 200
$Na_2O/SiO_2$=0.1 to 0.3
$Li_2O/(Na_2O+Li_2O)$=0.05 to 0.5
$H_2O/SiO_2$=10 to 50;
(2) adding an MTW-type zeolite which has a $SiO_2/Al_2O_3$ ratio of 10 to 500 and does not contain an organic compound, as a seed crystal, to the reaction mixture in a proportion of 0.1 to 20% by weight relative to the silica component in the reaction mixture; and
(3) airtightly heating the reaction mixture, to which the seed crystal has been added, at 100 to 200° C.

Advantageous Effects of Invention

As described above, in the present invention, since an MTW-type zeolite is produced from a reaction mixture which does not use SDA, by adding an MTW-type zeolite which does not contain organic matter, as a seed crystal, the resulting MTW-type zeolite does not essentially contain organic matter. Therefore, this MTW-type zeolite does not require firing treatment before it is used, does not require exhaust gas treat-

DESCRIPTION OF EMBODIMENTS

Figure 1:
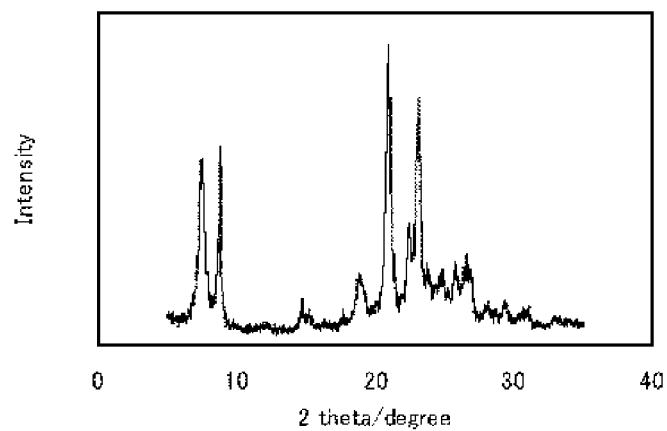
FIG. 1 is an X-ray diffraction pattern of the MTW-type zeolite after firing for the seed crystal having a $SiO_2/Al_2O_3$ ratio of 50.6 synthesized in Reference Example 1.

Hereinafter, the present invention will be described based on preferred embodiments thereof. The MTW-type zeolite synthesized according to the present invention does not essentially contain organic matter in the state where it is not heat-treated. The ions which compensate the negative charge of 4-coordinate aluminum of the aluminosilicate framework and are present outside the framework are sodium ions and lithium ions, and others which are present in micropores are only water or a small amount of adsorbed gas. That is, since the MTW-type zeolite synthesized according to the present invention is obtained by a production method in which SDA to be described below is not used, it does not essentially contain organic matter. The ratio of $SiO_2/Al_2O_3$ of the aluminosilicate framework is preferably in the range of 12 to 200. Further, the X-ray diffraction pattern of the MTW-type zeolite synthesized according to the present invention is essentially the same as the X-ray diffraction pattern of the MTW-type zeolite described in Non Patent Literature 2 as described above. From this, it is determined that the structural feature of the MTW-type zeolite synthesized according to the present invention is the same as that of conventional MTW-type zeolite synthesized using SDA.

One of the features of the production method of the present invention is that a reaction mixture is prepared without adding SDA which is composed of an organic compound. Specifically, an aqueous aluminosilicate gel containing sodium ions and lithium ions is used as a reaction mixture. It is an essential condition that sodium ions and lithium ions are allowed to be present together with the reaction mixture of the aqueous aluminosilicate gel. Further, their mixing proportions are such that the ratio $Li_2O/(Na_2O+Li_2O)$ is in the range of 0.05 to 0.5, preferably in the range of 0.1 to 0.4. If the ratio is outside this range, impurities will be accompanied, or the crystallinity of the MTW-type zeolite will be reduced.

Another feature of the production method of the present invention is the use of a seed crystal. An MTW-type zeolite produced by a conventional method, that is, a method in which SDA is used is fired to remove organic matter and used as a seed crystal. A method for synthesizing an MTW-type zeolite in accordance with a conventional method is described, for example, in Patent Literatures 1 to 3 as described above, and is well known to those skilled in the art. The type of SDA to be used is not limited, in a method for synthesizing the MTW-type zeolite in accordance with a conventional method. That is, the type of SDA may be any of organic ammonium ions such as tetraethylammonium ions, methyltriethylammonium ions, and benzyltriethylammonium ions as described above, or may be any other type.

In the synthesis of a seed crystal, it is preferred to add alkali metal ions simultaneously with the addition of SDA. It is preferred to use sodium and/or lithium ions as the alkali metal ions. Thus, once an MTW-type zeolite is synthesized, it is required to fire the MTW-type zeolite, for example, at a temperature of 500° C. or more in the air to remove SDA which is incorporated into the crystal, before using the MTW-type zeolite as a seed crystal. If the method of the present invention is performed using a seed crystal from which SDA is not removed, organic matter will enter the discharge liquor after completion of the reaction. Further, the MTW-type zeolite to be produced may contain SDA, which is contrary to the spirit of the present invention.

In the production method of the present invention, the MTW-type zeolite obtained in accordance with the present invention can also be used as a seed crystal. The MTW-type zeolite obtained by the present invention does not essentially contain an organic compound. Therefore, it has an advantage that when it is used as a seed crystal, it needs not be subjected to firing treatment beforehand.

Both in the case of using the MTW-type zeolite obtained in accordance with a conventional method and in the case of using the MTW-type zeolite obtained in accordance with the present invention, the $SiO_2/Al_2O_3$ ratio of the seed crystal is in the range of 10 to 500, preferably in the range of 10 to 200. If the $SiO_2/Al_2O_3$ ratio of the seed crystal is smaller than 10, the synthesis of the MTW-type zeolite will be difficult by any methods. On the other hand, if the $SiO_2/Al_2O_3$ ratio is larger than 500, the crystallization rate of the MTW-type zeolite will be very slow, which is not efficient.

The amount of the seed crystal added is in the range of 0.1 to 20% by weight, preferably in the range of 1 to 10% by weight, relative to the silica component in the reaction mixture as described above. Provided that the amount added is within the above range, the amount of the seed crystal added is smaller the better, and the amount added is determined in consideration of a reaction rate, an effect of suppressing impurities, and the like.

The grain size of the MTW-type zeolite seed crystal used in the present invention is not critical and not particularly limited in the present invention. It may be a size of a nanometer order or may be a size of a micrometer order. The size of the crystal of the zeolite obtained by synthesis is generally not uniform and has a certain degree of grain size distribution. When the crystal grain size having the maximum frequency in the distribution is defined as the average grain size, the average grain size may have influence on a crystallization rate or the size of crystals produced, but the difference in the average grain size of seed crystals will not cause essential trouble to the synthesis of the MTW-type zeolite.

The reaction mixture to which the seed crystal is added is obtained by mixing a silica source, an alumina source, an alkali source, a lithium source, and water so as to obtain a composition represented by the following molar ratios. If the composition of the reaction mixture is outside the following range, a target MTW-type zeolite cannot be obtained as apparent from the results of Comparative Examples to be described below.

$SiO_2/Al_2O_3$=12 to 200
$Na_2O/SiO_2$=0.1 to 0.3
$Li_2O/(Na_2O+Li_2O)$=0.05 to 0.5
$H_2O/SiO_2$=10 to 50

A more preferred range of the composition of the reaction mixture is as follows.

$SiO_2/Al_2O_3$=12 to 150
$Na_2O/SiO_2$=0.12 to 0.25
$Li_2O/(Na_2O+Li_2O)$=0.1 to 0.4
$H_2O/SiO_2$=12 to 30

The silica source used for obtaining the reaction mixture having the above molar ratios includes silica itself and a silicon-containing compound which can produce silicate ions in water. Specific examples include wet-process silica, dry-process silica, colloidal silica, sodium silicate, and aluminosilicate gel. These silica sources can be used individually or in combination of two or more. Among these silica sources, it is preferred to use silica (silicon dioxide) in that target zeolite can be obtained without being accompanied by an unnecessary by-product.

As the alumina source, a water-soluble aluminum-containing compound can be used, for example. Specific examples include sodium aluminate, aluminum nitrate, and aluminum sulfate. Further, aluminum hydroxide is also one of the suitable alumina sources. These alumina sources can be used individually or in combination of two or more. Among these alumina sources, it is preferred to use sodium aluminate and aluminum hydroxide in that target zeolite can be obtained without being accompanied by unnecessary by-products (for example, sulfate, nitrate, and the like).

As the alkali source, sodium hydroxide can be used, for example. Note that when sodium silicate is used as a silica source or when sodium aluminate is used as an alumina source, sodium which is an alkali metal component contained therein is considered to be NaOH at the same time, which is also an alkali component. Therefore, the above $Na_2O$ is calculated as the sum of all the alkali components in the reaction mixture.

As the lithium ion source, lithium salts are suitably used, including halides such as chlorides, bromides, and iodides and inorganic acid salts such as nitrates and sulfates. In addition, soluble organic salts may be used. Further, lithium hydroxide may be used as one of the lithium ion sources. In this case, since lithium hydroxide acts not only as a lithium ion source but also as an alkali source, it is necessary to take not only the $Li_2O/(Na_2O+Li_2O)$ ratio but also the optimization of the total alkali amount into consideration.

Any method by which a uniform reaction mixture can be easily obtained may be employed as the order of adding each raw material for preparing the reaction mixture. For example, a uniform reaction mixture can be obtained by adding an alumina source and a lithium source to an aqueous sodium hydroxide solution to dissolve the sources at room temperature, followed by adding a silica source and stirring and mixing. A seed crystal is added before adding a silica source or added while being mixed with a silica source. Subsequently, they are stirred and mixed so that the seed crystal is uniformly dispersed. The temperature at which the reaction mixture is prepared is also not particularly limited, and the preparation may be generally performed at room temperature (20 to 30° C.)

The reaction mixture containing the seed crystal is put in an airtight container and heated to react it to crystallize the MTW-type zeolite. SDA is not included in this reaction mixture. Crystallization sufficiently proceeds even while the airtight container is left standing. When the reaction mixture is stirred to achieve equalization of the temperature thereof during heating, it may be subjected to mixing with an impeller or mixing by rotation of the container. The strength of stirring and the number of rotations may be controlled depending on the uniformity of temperature and the manner in which impurities are by-produced. Intermittent stirring may be employed instead of continuous stirring.

Both in the case of a stationary method and a stirring method, the reaction mixture is heated at a heating temperature of 100 to 200° C., preferably 120 to 180° C., under a spontaneous pressure. If the temperature is less than 100° C., a crystallization rate will be extremely slow, thereby reducing the production efficiency of the MTW-type zeolite. On the other hand, a temperature exceeding 200° C. is not economical because an autoclave having high pressure resistance is required, and it increases the rate of impurity production. Therefore, this temperature range is not preferred. The heating time is not critical in the present production method, and the reaction mixture may be heated until an MTW-type zeolite having a sufficiently high crystallinity is produced. An MTW-type zeolite having a satisfactory crystallinity can be generally obtained by heating for about 5 to 500 hours.

The crystal of the MTW-type zeolite is obtained by the heating as described above. After completion of the heating, the produced crystal powder is separated from mother liquor by filtration, and then washed with water or warm water, and dried. Since the MTW-type zeolite does not contain organic matter in the dried state, it does not require firing and can be used as an adsorbent or the like if it is subjected to dehydration. Further, when the MTW-type zeolite is used as a solid acid catalyst, it can be used as an $H^+$ type, for example, by exchanging $Na^+$ ions and $Li^+$ ions in the crystal with $NH_4^+$ ions, followed by firing.

The MTW-type zeolite obtained by the present production method can be suitably used, for example, as an adsorption separating agent in various industrial fields and a catalyst in petrochemical industries, using the large micropore size and micropore volume and solid acid characteristics thereof.

EXAMPLES

Hereinafter, the present invention will be described in more detail with reference to Examples. However, the scope of the present invention is not limited to these Examples. Unless otherwise specified, "%" means "% by weight". Note that the analytical instruments used in the following Examples and Comparative Examples are as follows.

Powder X-ray diffractometer: A powder X-ray diffractometer MO3XHF[22] manufactured by Mac Science Co., Ltd., use of Cukα rays, voltage: 40 kV, current: 30 mA, scanning step: 0.02°, scanning speed: 2°/min Composition analyzer: ICP-AES LIBERTY Series II manufactured by Varian Inc.

Reference Example 1

A reaction mixture having a composition of $8TEA_2O \cdot 3.5Li_2O \cdot Al_2O_3 \cdot 40SiO_2 \cdot 640H_2O$ was prepared by using tetraethylammonium hydroxide as SDA, aluminum hydroxide as an alumina source, lithium bromide as a lithium source, and fine powder silica (Cab-O-sil, M-5) as a silica source and further adding water. This reaction mixture was put in an airtight container and heated at 160° C. for 5 days. The product was an MTW-type zeolite. This was fired in an electric furnace at 550° C. for 10 hours while circulating air to synthesize a seed crystal 1 which does not contain organic matter. The $SiO_2/Al_2O_3$ ratio after firing was 50.6. The X-ray diffraction pattern of this MTW-type zeolite is shown in FIG. 1.

Reference Example 2

Figure 2:
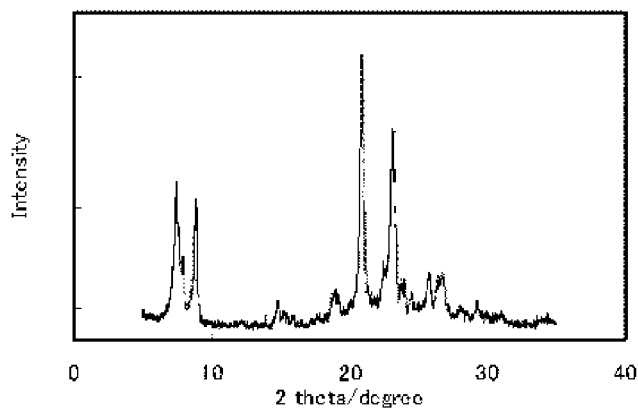
FIG. 2 is an X-ray diffraction pattern of the MTW-type zeolite after firing for the seed crystal having a $SiO_2/Al_2O_3$ ratio of 101.2 synthesized in Reference Example 1.

A reaction mixture having a composition of $9.8TEA_2O \cdot 0.79Na_2O \cdot Al_2O_3 \cdot 80SiO_2 \cdot 1040H_2O$ was prepared by using tetraethylammonium hydroxide as SDA, sodium aluminate as an alumina source, and fine powder silica (Cab-O-sil, M-5) as a silica source and further adding water. This reaction mixture was put in an airtight container and heated at 160° C. for 8 days. The product was an MTW-type zeolite. This was fired in an electric furnace at 550° C. for 10 hours while circulating air to synthesize a seed crystal 2 which does not contain organic matter. The $SiO_2/Al_2O_3$ ratio after firing was 101.2. The X-ray diffraction pattern of this MTW-type zeolite is shown in FIG. 2.

Example 1

Figure 3:
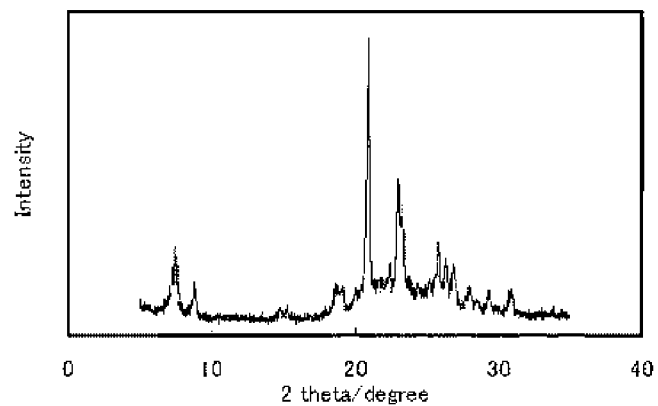
FIG. 3 is an X-ray diffraction pattern of the MTW-type zeolite synthesized in Example 1.

The reaction mixture having the composition described in Table 1 was prepared by dissolving 0.30 g of sodium hydroxide in 5.8 g of distilled water and adding thereto 0.31 g of lithium bromide monohydrate, 0.16 g of aluminum hydroxide, 0.12 g of the seed crystal 1, and 1.20 g of silica (Cab-O-Sil M5) in this order, followed by uniformly stirring. This reaction mixture was put in an airtight container and heated at 140° C. for 7 days. The product was separated by filtration, washed with water, and then dried at 60° C. This product was an MTW-type zeolite which does not contain impurities, as apparent from the X-ray diffraction pattern shown in FIG. 3. The results of the composition analysis were as shown in Table 1.

Example 2

Figure 4:
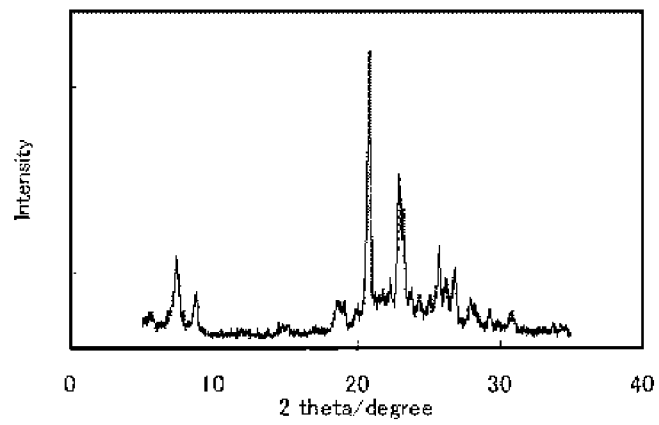
FIG. 4 is an X-ray diffraction pattern of the MTW-type zeolite synthesized in Example 2.

The reaction mixture having the composition described in Table 1 was prepared using the same raw materials as in Example 1, and it was heated under the conditions as described in the same table. The product was an MTW-type zeolite which does not contain impurities, as apparent from the X-ray diffraction pattern shown in FIG. 4. The product was as described in Table 1.

Example 3

Figure 5:
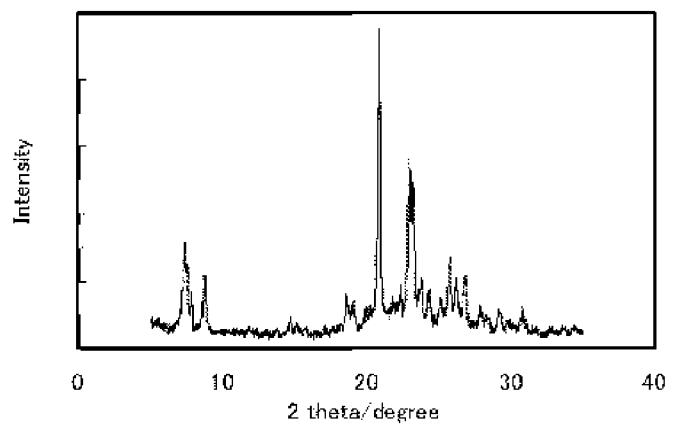
FIG. 5 is an X-ray diffraction pattern of the MTW-type zeolite synthesized in Example 3.

The reaction mixture having the composition described in Table 1 was prepared using the same raw materials as in Example 1 except that the MTW-type zeolite seed crystal 2 synthesized in Reference Example 2 was used, and it was heated under the conditions as described in the same table. The product was an MTW-type zeolite which does not contain impurities, as apparent from the X-ray diffraction pattern shown in FIG. 5. The composition of the product was as described in Table 1.

Example 4

The reaction mixture having the composition described in Table 1 was prepared using the same raw materials as in Example 1 except that the amount of the seed crystal 1 added was set at 1%, and it was heated under the conditions as described in the same table. As a result, the product and the composition thereof were as described in Table 1.

Examples 5 to 13

The reaction mixtures each having the composition described in Table 1 were prepared using the same raw materials as in Example 1, and they were heated under the conditions as described in the same table. As a result, the products and the compositions thereof were as described in Table 1.

TABLE 1

| Example | Composition of reaction mixture | | | | Seed crystal | | Heating | | Product | | | |
|---|---|---|---|---|---|---|---|---|---|---|---|---|
| | $SiO_2/Al_2O_3$ | $Na_2O/SiO_2$ | $Li_2O/(Na_2O+Li_2O)$ | $H_2O/SiO_2$ | $SiO_2/Al_2O_3$ | Amount added [*1] (wt %) | Temperature (° C.) | Time (day) | Zeolite | $SiO_2/Al_2O_3$ | $Na_2O/Al_2O_3$ | $Li_2O/Al_2O_3$ |
| 1 | 20 | 0.188 | 0.286 | 16 | 50.6 | 10 | 140 | 7 | MTW-type | 19.2 | 0.42 | 0.46 |
| 2 | 40 | 0.188 | 0.286 | 16 | 50.6 | 10 | 140 | 7 | MTW-type, very small amount of layered silicate | 36.6 | 0.80 | 0.47 |
| 3 | 20 | 0.188 | 0.286 | 16 | 101.2 | 10 | 140 | 7 | MTW-type | 17.8 | 0.68 | 0.34 |
| 4 | 20 | 0.188 | 0.286 | 16 | 50.6 | 1 | 140 | 24 | MTW-type | 19.0 | 0.50 | 0.49 |
| 5 | 60 | 0.188 | 0.286 | 16 | 50.6 | 10 | 140 | 14 | MTW-type | — | — | — |
| 6 | 100 | 0.188 | 0.286 | 16 | 50.6 | 10 | 140 | 14 | MTW-type, very small amount of layered silicate | — | — | — |
| 7 | 15 | 0.188 | 0.286 | 16 | 50.6 | 10 | 140 | 7 | MTW-type | 17.8 | 0.36 | 0.50 |
| 8 | 30 | 0.188 | 0.286 | 16 | 50.6 | 10 | 140 | 7 | MTW-type | 33.0 | 0.52 | 0.60 |
| 9 | 40 | 0.150 | 0.286 | 16 | 50.6 | 10 | 140 | 10 | MTW-type | — | — | — |
| 10 | 40 | 0.225 | 0.286 | 16 | 50.6 | 10 | 140 | 7 | MTW-type, very small amount of ZSM-5 | — | — | — |
| 11 | 20 | 0.188 | 0.150 | 16 | 50.6 | 10 | 140 | 7 | MTW-type | — | — | — |
| 12 | 20 | 0.188 | 0.320 | 16 | 50.6 | 10 | 140 | 7 | MTW-type | — | — | — |
| 13 | 40 | 0.188 | 0.444 | 16 | 50.6 | 10 | 140 | 7 | MTW-type, very small amount of layered silicate | — | — | — |

[*1] Amount of silica relative to reaction mixture

Comparative Example 1

The reaction mixture having the composition described in Table 2 was prepared using the same raw materials as used in Example 1 and the seed crystal 1 except that lithium bromide monohydrate was not added, and it was heated under the conditions as described in the same table. As a result, the product was as described in Table 2.

Comparative Examples 2 and 3

The reaction mixtures each having the composition described in Table 2 were prepared using the same raw materials as used in Example 1 and the seed crystal 1, and they were heated under the conditions as described in the same table. As a result, the product was as described in Table 2.

Comparative Example 4

The reaction mixture having the composition described in Table 2 was prepared using the same raw materials as used in Example 1 except that a seed crystal was not added, and it was heated under the conditions as described in the same table. As a result, the product was as described in Table 2.

TABLE 2

| Comparative Example | Composition of reaction mixture | | | | Seed crystal | | Heating | | Product Zeolite |
|---|---|---|---|---|---|---|---|---|---|
| | $SiO_2/Al_2O_3$ | $Na_2O/SiO_2$ | $Li_2O/(Na_2O+Li_2O)$ | $H_2O/SiO_2$ | $SiO_2/Al_2O_3$ | Amount added *1 (wt %) | Temperature (°C.) | Time (day) | |
| 1 | 40 | 0.188 | 0 | 16 | 50.6 | 10 | 150 | 4 | ZSM-5 |
| 2 | 40 | 0.188 | 0.600 | 16 | 50.6 | 10 | 150 | 4 | Lithium silicate |
| 3 | 10 | 0.188 | 0.286 | 16 | 50.6 | 10 | 140 | 7 | Mordenite |
| 4 | 40 | 0.188 | 0.286 | 16 | — | 0 | 140 | 7 | Layered silicate |

*1 Amount of silica relative to reaction mixture

The invention claimed is:

1. A method for producing an MTW-type zeolite, comprising:
   (1) mixing an alumina source, an alkali source, a lithium source, and water so as to obtain a reaction mixture,
   (2) adding a seed crystal of an MTW-type zeolite before adding a silica source or adding the seed crystal of the MTW type zeolite while being mixed with a silica source, to the reaction mixture in a proportion of 0.1 to 20% by weight relative to the silica component in the reaction mixture, mixing and stirring,
   wherein the MTW-type zeolite of the seed crystal has a $SiO_2/Al_2O_3$ ratio of 10 to 500 and does not contain an organic compound;
   wherein the resulting reaction mixture has a composition represented by the following molar ratios:
   $SiO_2/Al_2O_3$=12 to 200
   $Na_2O/SiO_2$=0.1 to 0.3
   $Li_2O/(Na_2O+Li_2O)$=0.05 to 0.5
   $H_2O/SiO_2$=10 to 50;
   and
   (3) air tightly heating the reaction mixture, to which the seed crystal of the MTW type zeolite has been added, at 100 to 200° C.

* * * * *